US012722446B2

(12) United States Patent
Matsuo et al.

(10) Patent No.: US 12,722,446 B2
(45) Date of Patent: Sep. 1, 2026

(54) VEHICLE STEERING DEVICE

(71) Applicant: SUBARU CORPORATION, Tokyo (JP)

(72) Inventors: Shunsuke Matsuo, Tokyo (JP); Koichi Uchikawa, Tokyo (JP); Manabu Tonozaki, Tokyo (JP)

(73) Assignee: SUBARU CORPORATION, Tokyo (JP)

(*) Notice: Subject to any disclaimer, the term of this patent is extended or adjusted under 35 U.S.C. 154(b) by 0 days.

(21) Appl. No.: 19/342,780

(22) Filed: Sep. 29, 2025

(65) Prior Publication Data

US 2026/0091640 A1 Apr. 2, 2026

(30) Foreign Application Priority Data

Oct. 2, 2024 (JP) ................................ 2024-173458

(51) Int. Cl.
*B60G 21/055* (2006.01)
*B62D 7/16* (2006.01)

(52) U.S. Cl.
CPC ........... *B60G 21/0553* (2013.01); *B62D 7/16* (2013.01); *B60G 2204/41* (2013.01)

(58) Field of Classification Search
CPC .............. B60G 21/055; B60G 21/0551; B60G 21/0553
See application file for complete search history.

(56) References Cited

U.S. PATENT DOCUMENTS 4,815,759 A * 3/1989 Imai ........................ B62B 13/10 188/82.8

FOREIGN PATENT DOCUMENTS

JP 5374282 B2 12/2013

* cited by examiner

*Primary Examiner* — Jason D Shanske
*Assistant Examiner* — Matthew James O'Neill
(74) *Attorney, Agent, or Firm* — Rimon P.C.

(57) ABSTRACT

A vehicle steering device includes: a steering mechanism including a rack shaft that has both ends coupled to left and right steering knuckles supporting left and right steerable wheels and steers the steerable wheels; a suspension arm swingably coupled between a vehicle body and a knuckle arm provided on each of the steering knuckles; and a stabilizer bar disposed along the steering mechanism restrains a roll of the vehicle body. Both ends of the stabilizer bar are coupled to the suspension arms. The vehicle steering device further includes: a stabilizer bush that supports the stabilizer bar rotatably and slidably in a vehicle width direction of the vehicle body with respect to the vehicle body; and a link lever connecting the rack shaft and the stabilizer bar and that relatively slides the stabilizer bar in a direction opposite to a sliding direction of the rack shaft.

5 Claims, 4 Drawing Sheets

FIG. 1

θin
Δθin
1
2r (STEERABLE INNER WHEEL)
9
7
8
5a
10
4
13
3
Fw

VEHICLE STEERING DEVICE

CROSS-REFERENCE TO RELATED APPLICATIONS

The present application claims priority from Japanese Patent Application No. 2024-173458 filed on Oct. 2, 2024, the entire contents of which are hereby incorporated by reference.

BACKGROUND

The disclosure relates to a vehicle steering device.

In order to smoothly travel during turning, a vehicle such as an automobile is set such that center axes of wheels intersect at one point when steerable wheels (mainly front wheels) are steered. A center of turning is set on an extension line of non-steerable wheels (mainly rear wheels). Ackerman geometry is known in which an extension line of axles of left and right steerable wheels is crossed at a turning center and all of the wheels are turned at the same turning center.

By turning the vehicle based on the Ackerman geometry, it is possible to turn the vehicle smoothly without placing a load on tires. Based on the Ackerman geometry, a steering angle difference (Ackerman angle) is generated in which a steering angle of a steerable wheel on a turning inner side is larger than a steering angle of a steerable wheel on a turning outer side.

This Ackerman angle is implemented by suspension geometry (a geometric shape and a positional relationship of elements constituting the suspension).

However, it is difficult to obtain an ideal steering angle difference based on the suspension geometry even when the steering angle increases due to constraints on a vehicle body structure such as a brake design. As a result, a steering feeling is worsened, and abnormal noise during steering and uneven wear due to drag of the tire are caused.

SUMMARY

An aspect of the disclosure provides a vehicle steering device including: a steering mechanism including a rack shaft that has both ends coupled to left and right steering knuckles supporting left and right steerable wheels and is configured to steer the steerable wheels; a suspension arm swingably coupled between a vehicle body and a knuckle arm provided on each of the steering knuckles; and a stabilizer bar disposed along the steering mechanism and configured to restrain a roll of the vehicle body. Both ends of the stabilizer bar are coupled to the suspension arms. The vehicle steering device further includes: a stabilizer bush configured to support the stabilizer bar rotatably and slidably in a vehicle width direction of the vehicle body with respect to the vehicle body; and a link lever connecting the rack shaft and the stabilizer bar and configured to relatively slide the stabilizer bar in a direction opposite to a sliding direction of the rack shaft.

BRIEF DESCRIPTION OF THE DRAWINGS

The accompanying drawings are included to provide a further understanding of the disclosure and are incorporated in and constitute a part of this specification. The drawings illustrate an embodiment and, together with the specification, serve to describe the principles of the disclosure.

FIG. 1 is a schematic plan view illustrating a steering device of a steerable wheel.

DETAILED DESCRIPTION

Figure 2:
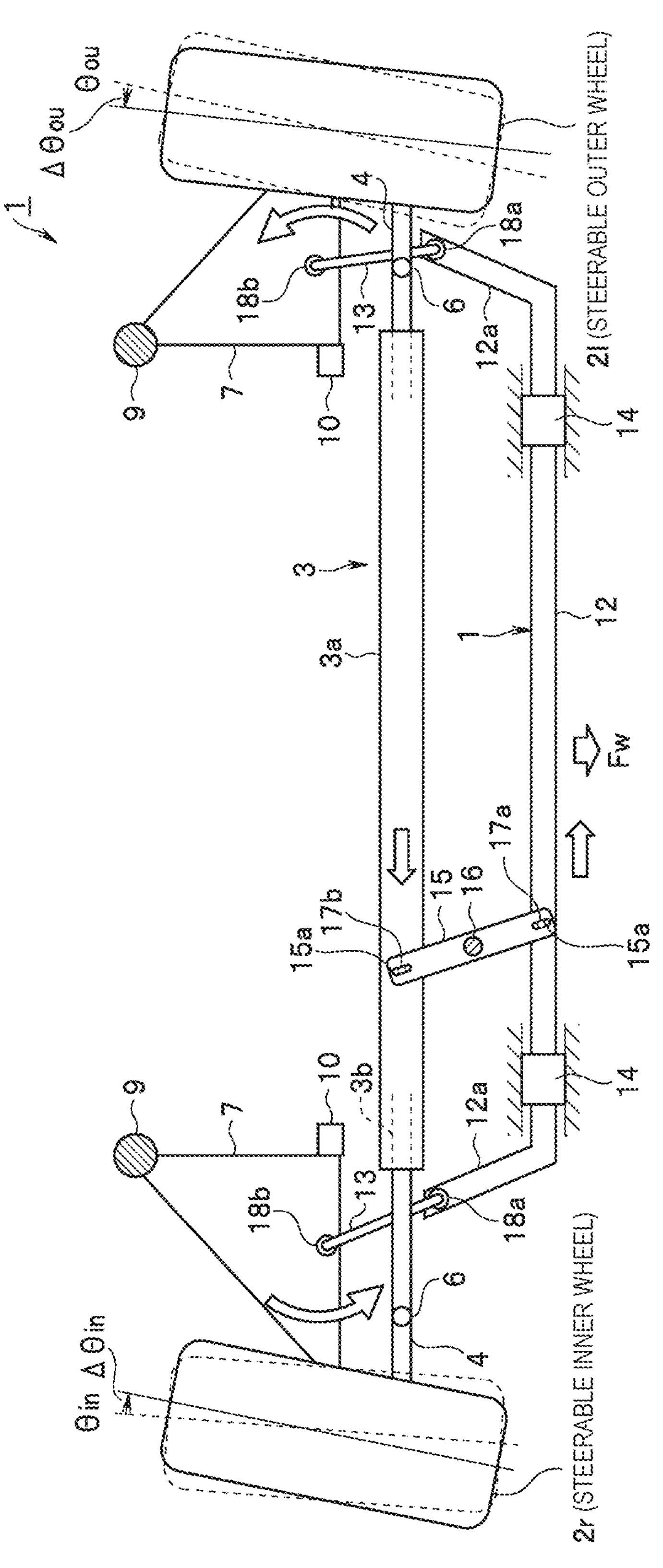
FIG. 2 is a schematic plan view of the steering device illustrating an operation of left and right steerable wheels during right turning.

Japanese Patent No. 5374282 proposes a technique of increasing a steering angle of a steerable wheel on a turning inner side by utilizing a fact that a suspension arm (lower arm) that supports an inner steerable wheel during turning is pulled in a turning center direction by a cornering force, displacing a rear bush provided at a coupling portion between the suspension arm and a vehicle body, and rotating the suspension arm by the displacement.

In the technique disclosed in the above-described literature, the steering angle of the steerable wheel on the turning inner side is increased, so that an Ackerman angle can be made close to Ackerman geometry.

However, in this literature, the cornering force is used to increase the steering angle of the steerable wheel on the turning inner side. The cornering force changes in accordance with a vehicle speed and a turning curvature during turning. Therefore, a steering angle increase amount of the steerable wheel on the turning inner side is not constant, and it is difficult to always obtain a stable steering feeling.

It is desirable to provide a vehicle steering device capable of providing a stable steering angle difference between left and right steerable wheels and obtaining a favorable steering feeling even when it is difficult to provide an ideal steering angle difference between the left and right steerable wheels by suspension geometry during steering.

In the following, an embodiment of the disclosure is described in detail with reference to the accompanying drawings. Note that the following description is directed to an illustrative example of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiment which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description.

Figure 1:
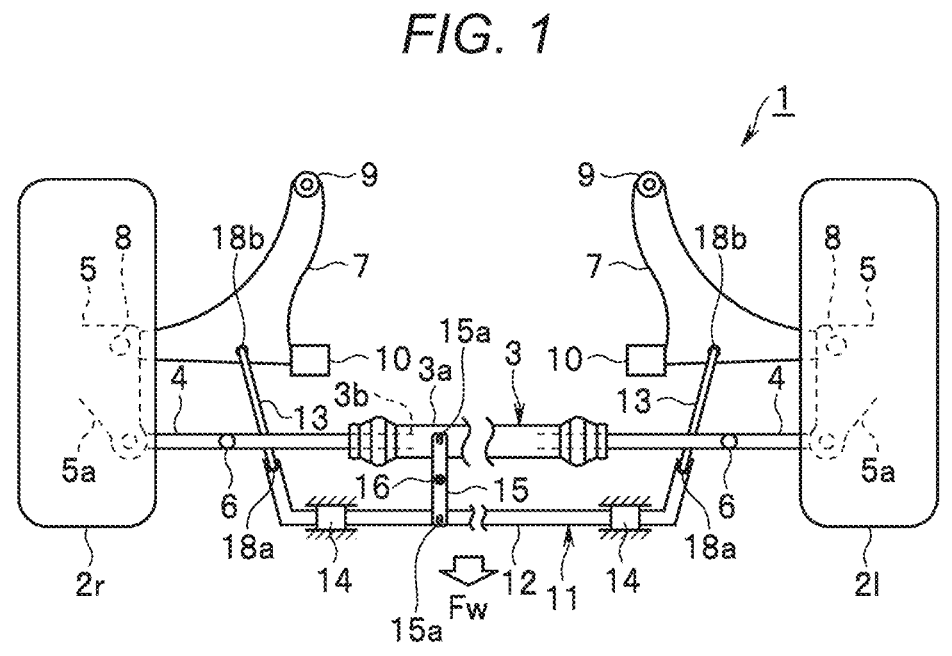

A steering device 1 illustrated in FIG. 1 is provided at a front portion of a vehicle. The steering device 1 steers left and right steerable wheels (front wheels) **2*l* and 2*r*** in conjunction with an operation of a steering wheel (not illustrated) and driving of an electric power steering (EPS) motor.

The steering device 1 includes a steering mechanism 3. The steering mechanism 3 is, for example, a rack and pinion type, and is disposed in a vehicle width direction. A steering gear box 3*a* of the steering mechanism 3 is fixed to a vehicle body frame. A rack shaft 3*b* in the steering gear box 3*a* is reciprocally and slidably supported in an axial direction. A pinion formed on a pinion shaft is meshed with a rack (not illustrated) formed on the rack shaft 3*b*. The pinion shaft is connected to a steering shaft. The steering wheel operated by a driver is fixed to a base end of the steering shaft.

Both end sides of the rack shaft 3*b* protrude from both ends of the steering gear box 3*a*. Ends of tie rods 4 are connected to both ends of the rack shaft 3*b* via ball joints 6. The ends (tie rod end) of the tie rods 4 are swingably coupled to front ends of knuckle arms 5*a* of steering knuckles 5 on an inner side of the vehicle width direction via the ball joints 6, respectively.

The knuckle arms 5*a* are permanently affixed with the steering knuckles 5, respectively. The steering knuckles 5 rotatably support an axle to which the left and right steerable wheels 2*l* and 2*r* are fixed. A lower portion of a suspension (not illustrated) is fixed to the steering knuckle 5. The steering knuckles 5 rotate the left and right steerable wheels 2*l* and 2*r* together with the suspension around a kingpin axis to determine traveling of a host vehicle. When the driver operates the steering wheel or drives the EPS motor, the rack shaft 3*b* of the steering mechanism 3 rotates the steering knuckles 5 via the tie rods 4.

In addition, rear ends of the knuckle arms 5*a* on the inner side of the vehicle width direction are coupled to ends of suspension arms (lower arm) 7 on an outer side of the vehicle width direction via ball joints 8, respectively. Front and rear ends of the suspension arm 7 on the inner side are swingably coupled to the vehicle body frame via rubber bushes 9 and 10. Hardness of the rubber bush 10 is high. On the other hand, hardness of the rubber bush 9 is soft, which is lower than the hardness of the rubber bush 10.

In addition, a stabilizer bar 12 of a stabilizer 11 is disposed in front of the steering mechanism 3. The stabilizer 11 includes the stabilizer bar 12 and stabilizer links 13. The stabilizer bar 12 is a rod-shaped member having springiness, such as spring steel.

A center portion of the stabilizer bar 12 is disposed parallel to the steering mechanism 3. In addition, both ends 12*a* of the stabilizer bar 12 are bent toward the suspension arms 7. Further, stabilizer bushes 14 are attached to left and right sides of the center portion of the stabilizer bar 12 with a predetermined interval. A bracket (not illustrated) is attached to an outer circumference of the stabilizer bush 14. The bracket is fixed to the vehicle body frame. The stabilizer bush 14 supports the stabilizer bar 12 rotatably about an axial center and slidably in the axial direction.

One end of the stabilizer link 13 is coupled to the end 12*a* of the stabilizer bar 12 via a ball joint 18*a*. In addition, the other end of the stabilizer link 13 is coupled to an extension of one end of the stabilizer link 13, which is a front end of the suspension arm 7, via a ball joint 18*b*. The stabilizer bar 12 generates a torsion stress when the vehicle turns and a stroke difference occurs between left and right suspensions, and restrains rolling (inclination) of the vehicle body due to a restoring force of the torsion stress.

In addition, a portion of the stabilizer bar 12 between the stabilizer bushes 14 and the rack shaft 3*b* provided to the steering mechanism 3 are connected to each other via a link lever 15. An intermediate portion of the link lever 15 is rotatably supported by the vehicle body frame via a support shaft 16. The link lever 15 slides the stabilizer bar 12 relative to a slide of the rack shaft 3*b* in an opposite direction. In addition, elongated holes 15*a* are formed in respective ends of the link lever 15.

Pin shafts 17*a* and 17*b* are inserted through the respective elongated holes 15*a*. The (one) pin shaft 17*a* is implanted in the stabilizer bar 12. The (other) pin shaft 17*b* is implanted in the rack shaft 3*b*. A long side direction of the elongated hole 15*a* is formed along a long side direction of the link lever 15. A width of the elongated hole 15*a* on a short side is the same as or slightly wider than a diameter of each of the pin shafts 17*a* and 17*b*. Although not illustrated, the steering gear box 3*a* has an escape hole that allows movement of the pin shaft 17*b* that slides together with the rack shaft 3*b*. The escape hole and the pin shaft 17*b* are covered with a rubber boot having sealability. This rubber boot maintains airtightness of an inside.

A tip of the pin shaft 17*b* protrudes from the rubber boot. A protruding portion of the pin shaft 17*b* is inserted into the elongated hole 15*a*.

When the rack shaft 3*b* slides, the stabilizer bar 12 slides relatively in the opposite direction via the link lever 15. A slide amount of the stabilizer bar 12 with respect to the rack shaft 3*b* is adjusted by changing a lever ratio from the support shaft 16 to both of the pin shafts 17*a* and 17*b*. When the stabilizer bar 12 relatively slides in the opposite direction to the rack shaft 3*b*, the stabilizer links 13 that are connected to both ends displace the left and right suspension arms 7. Accordingly, a steering angle of a steerable inner wheel is increased, a steering angle of a steerable outer wheel is decreased, and a steering angle difference between the two wheels is increased.

Next, an operation of the steering device 1 having such a configuration will be described. In the following, a state of turning g the vehicle to the right will be exemplified. Therefore, the left and right are reversed in left turning. In addition, as illustrated in FIG. 2, in right turning, the right steerable wheel (front wheel) 2*r* serves as the steerable inner wheel, and the left steerable wheel (front wheel) 2*l* serves as the steerable outer wheel.

When the vehicle enters a right curved road or changes the vehicle to an adjacent right lane, the driver operates the steering wheel or a driving assist device drives the EPS motor, the rack shaft 3*b* of the steering mechanism 3 is supported by the steering gear box 3*a* and slides toward the right steerable wheel 2*r*. Then, the tie rods 4 coupled to the rack shaft 3*b* rotate the steering knuckles 5 around the kingpin axis via the knuckle arms 5*a*, and cause the steerable wheels 2*l* and 2*r* to have steering angles in a turning direction. At this time, a steering difference is generated in which a steering angle θin of the right steerable wheel 2*r* is larger than a steering angle θou of the left steerable wheel 2*l*, based on the known suspension geometry.

In addition, during traveling, movement of the suspensions is transmitted to the suspension arms 7 via the steering knuckles 5. At this time, when a rolling moment to a turning outer side is generated in the vehicle due to the turning, a reactive force (restoring force) by the torsion is generated in the stabilizer bar 12 coupled to the suspension arms 7 via the stabilizer links 13. Accordingly, generation of a roll is restrained.

Therefore, when the steering angles of the steerable wheels 2*l* and 2*r* gradually increase, it becomes difficult to obtain an ideal steering angle difference (Ackerman angle) between the left and right steerable wheels 2*l* and 2*r* based on the suspension geometry.

In the present embodiment, the stabilizer bar 12 is used to increase the steering angle difference. That is, as illustrated in FIG. 2, when the rack shaft 3*b* slides toward the right steerable wheel 2*r*, the link lever 15 connected to one end of the rack shaft 3*b* via the pin shaft 17*b* is rotated in a counterclockwise direction in FIG. 2 while being supported by the support shaft 16.

Then, the link lever 15 presses the stabilizer bar 12, which is connected to the other end of the link lever 15 via the pin shaft 17*a*. As a result, the stabilizer bar 12 slides in a direction opposite to a sliding direction of the rack shaft 3*b*, in a state of being supported by the stabilizer bushes 14.

When the stabilizer bar 12 slides in the direction opposite to the sliding direction of the rack shaft 3*b*, the right end 12*a* of the stabilizer bar 12 pulls the right suspension arm 7 forward via the stabilizer link 13. Meanwhile, the left end 12*a* of the stabilizer bar 12 presses the left suspension arm 7 rearward via the stabilizer link 13.

The rubber bush 10 that supports the suspension arm 7 is hard. The rubber bush 9 is soft having relatively low hardness. When the stabilizer bar 12 pulls the right suspension arm 7 forward, the suspension arm 7 tends to be displaced in a counterclockwise direction indicated by arrows in FIGS. 2 and 3 by elastically deforming the rubber bush 9 having low hardness around the hard rubber bush 10.

The roll toward the turning outer side is generated in the vehicle body during turning. Therefore, the torsion caused by the stabilizer bar 12 due to the roll generates as a downward reactive force. This reactive force acts as a stress on the left and right suspension arms 7. Therefore, loads of both of a forward pulling force by the stabilizer bar 12 and a reactive force by the torsion of the stabilizer bar 12 are applied to the right suspension arm 7.

The loads applied to the right suspension arm 7 are transmitted to the knuckle arm 5*a* via the ball joint 8. The steering knuckle 5 permanently affixed with the knuckle arm 5*a* is rotatably supported around the kingpin axis. The steering knuckle 5 is integral with the suspension and is allowed to move in an upper-lower direction.

Therefore, the steering knuckle 5 is pushed downward by receiving both loads of the displacement due to the counterclockwise load applied to the right suspension arm 7 and the reactive force due to the torsion of the stabilizer bar 12. As a result, a distance (radius) of the suspension arm 7 coupling the kingpin axis and the end of the tie rod 4 is apparently shortened. Therefore, as illustrated in FIG. 4, as a stroke of the rack shaft 3*b* increases, the steering angle $\theta$ of the right steerable wheel 2*r* increases by $\Delta\theta in$.

Meanwhile, the left suspension arm 7 is pressed rearward of the vehicle body by the stabilizer link 13. The stabilizer link 13 is slightly bent when pressing the left suspension arm 7. Therefore, the left suspension arm 7 is displaced by a smaller amount than the right suspension arm 7. In this case, a load due to an upward reactive force from the stabilizer bar 12 is simultaneously applied to the left suspension arm 7.

The load applied to the left suspension arm 7 is transmitted to the knuckle arm 5*a* via the ball joint 8. As a result, t steering knuckle 5 is pushed upward by receiving the load from the left suspension arm 7. As a result, the distance (radius) of the suspension arm 7 coupling the kingpin axis and the end of the tie rod 4 is apparently increased. Therefore, as illustrated in FIG. 5, as the stroke of the rack shaft 3*b* decreases, the steering angle $\theta$ of the left steerable wheel 2*l* decreases by $\Delta\theta ou$.

Figures 3, 4:
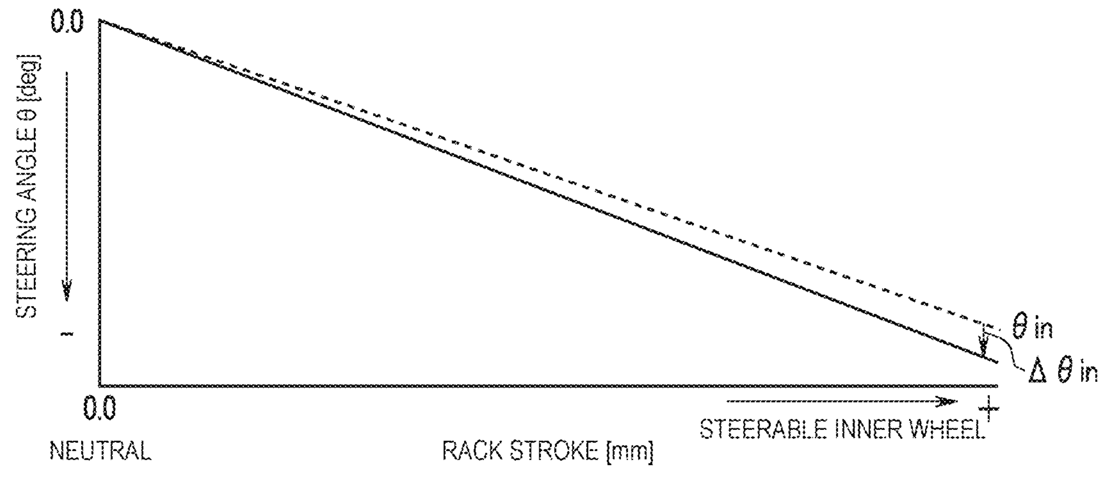
FIG. 3 is a partial plan view of the steering device illustrating an operation of a steerable inner wheel during right turning.
FIG. 4 is a characteristic diagram illustrating a change in a steering angle with respect to a rack stroke of the steerable inner wheel during turning.
Figure 5:
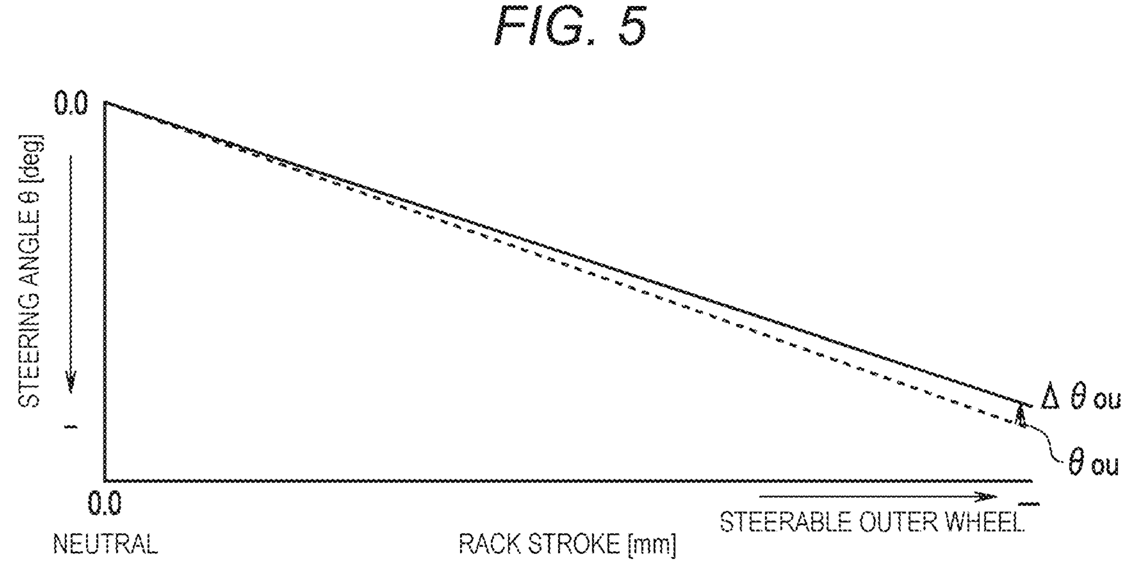
FIG. 5 is a characteristic diagram illustrating a change in a steering angle with respect to a rack stroke of a steerable outer wheel during turning.

In this manner, when the vehicle is turning, as the rack stroke of the rack shaft 3*b* increases to the turning inner side, the steering angle of the right steerable wheel 2*r* increases to $\theta in+\Delta\theta in$, and the steering angle of the left steerable wheel 2*l* decreases to $\theta ou-\Delta\theta ou$, as illustrated in FIGS. 4 and 5. Therefore, the steering angle difference between the two steerable wheels is increased by $\Delta\theta in+\Delta\theta ou$.

As a result, even when it is difficult to provide an ideal steering angle difference between the left and right steerable wheels 2*l* and 2*r* based on the suspension geometry during turning, the suspension arm 7 is displaced by the stabilizer bar 12 on the turning inner side, so that the radius of the suspension arm 7 is apparently shortened. In addition, the suspension arm 7 is displaced by the stabilizer bar 12 on the turning outer side, so that the radius of the left suspension arm 7 apparently becomes slightly increased. Therefore, by adjusting the lever ratio of the link lever 15 for each vehicle type, the steering angle difference can be brought close to an ideal value.

In this manner, in the present embodiment, when the steering mechanism 3 is operated during turning, the stabilizer bar 12 slides in the direction opposite to the sliding direction of the rack shaft 3*b* due to the operation of the link lever 15. Accordingly, on a steerable inner wheel side, the suspension arm 7 is pulled forward, and the radius of the suspension arm 7 is apparently shortened. On the other hand, on the steerable outer wheel side, the suspension arm 7 is pushed rearward, and the radius of the suspension arm 7 apparently becomes slightly increased.

As a result, the steering angle of the steerable inner wheel is increased, the steering angle of the steerable outer wheel is decreased, and the steering angle difference is increased. The expansion of the steering angle difference can be set by adjusting the lever ratio of the link lever 15. Therefore, by adjusting the lever ratio of the link lever 15, even when it is difficult to provide an ideal steering angle difference between left and right steerable wheels based on the suspension geometry during turning, it is possible to provide a stable steering angle difference between the left and right steerable wheels, and it is possible to obtain a favorable steering feeling.

It is noted that the disclosure is not limited to the above-described embodiment. For example, the steering device 1 can be applied not to front wheel steering but also to rear wheel steering and four-wheel steering.

According to the embodiment of the disclosure, both ends of the stabilizer bar are coupled to the suspension arms, the stabilizer bar is rotatably supported via the stabilizer bushes and slidably in the vehicle width direction, with respect to the vehicle body, the rack shaft and the stabilizer bar are connected to each other by the link lever, and the stabilizer bar relatively slides in a direction opposite to a sliding direction of the rack shaft. Therefore, even when it is difficult to provide an ideal steering angle difference between the left and right steerable wheels based on the suspension geometry during turning, the suspension arms are displaced by the stabilizer bar, so that a stable steering angle difference can be provided between the left and right steerable wheels. As a result, a favorable steering feeling can be obtained.

The invention claimed is:

1. A vehicle steering device comprising:

a steering mechanism comprising a rack shaft having both ends coupled to left and right steering knuckles supporting left and right steerable wheels, the rack shaft being configured to steer the steerable wheels;

a suspension arm swingably coupled between a vehicle body and a knuckle arm provided on each of the steering knuckles; and a stabilizer bar disposed along the steering mechanism and configured to restrain a roll of the vehicle body, wherein both ends of the stabilizer bar are coupled to the suspension arms, the vehicle steering device further comprising:

a stabilizer bush configured to support the stabilizer bar rotatably and slidably in a vehicle width direction of the vehicle body with respect to the vehicle body; and a link lever connecting the rack shaft and the stabilizer bar and configured to relatively slide the stabilizer bar in a direction opposite to a sliding direction of the rack shaft.

2. The vehicle steering device according to claim 1, wherein an intermediate portion of the link lever is rotatably supported by the vehicle body via a support shaft, and the rack shaft and the stabilizer bar are connected to opposite sides of the link lever that sandwich the support shaft of the link lever.

3. The vehicle steering device according to claim 1, wherein each suspension arm is supported by the vehicle body via an elastically deformable bush.

4. The vehicle steering device according to claim 1, wherein the stabilizer bar and each suspension arm are coupled to each other via a stabilizer link.

5. The vehicle steering device according to claim 2, wherein a lever ratio from the support shaft of the link lever to the rack shaft and the stabilizer bar is variably set.

* * * * *